Dec. 26, 1967 W. L. HULSLANDER 3,360,236
PLUG VALVE WITH FLOATING SEAL
Filed March 16, 1965 2 Sheets-Sheet 1

INVENTOR.
WILLIAM L. HULSLANDER

Dec. 26, 1967    W. L. HULSLANDER    3,360,236
PLUG VALVE WITH FLOATING SEAL
Filed March 16, 1965    2 Sheets-Sheet 2
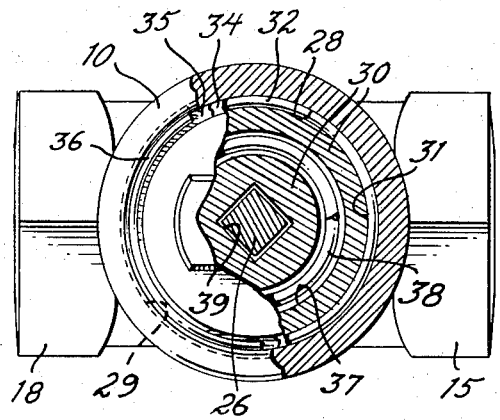
Fig. 5
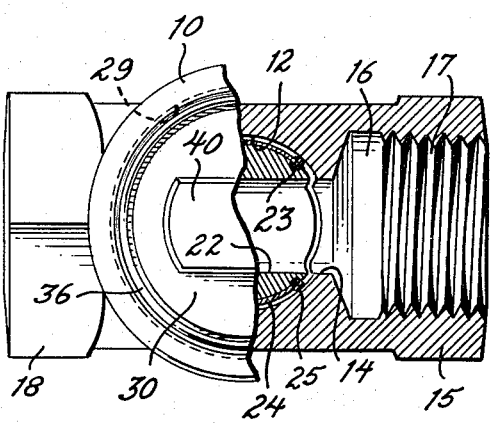
Fig. 6
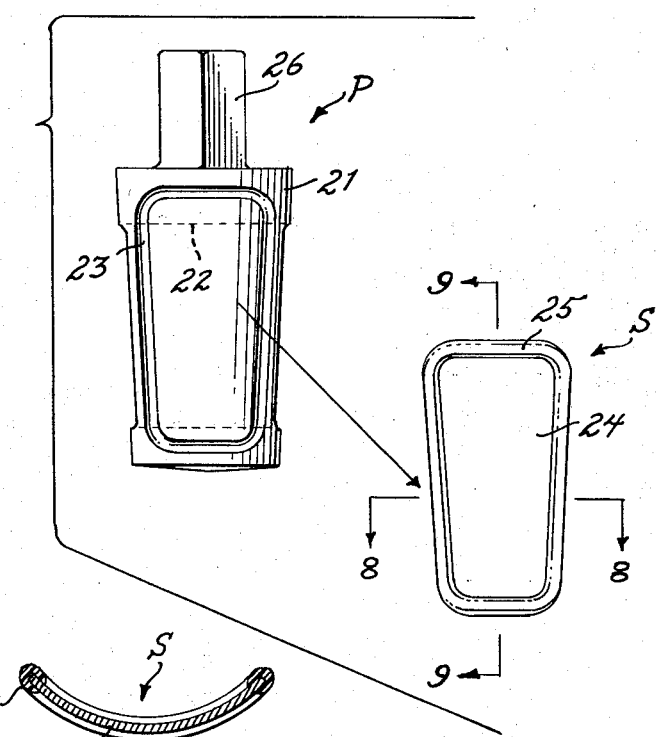
Fig. 7
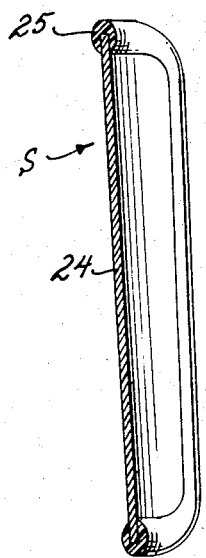
Fig. 8
Fig. 9
INVENTOR
WILLIAM L. HULSLANDER

United States Patent Office 3,360,236
Patented Dec. 26, 1967

3,360,236
PLUG VALVE WITH FLOATING SEAL
William L. Hulslander, Bradford, Pa., assignor to Dresser Industries, Inc., Dallas, Tex., a corporation of Delaware
Filed Mar. 16, 1965, Ser. No. 440,101
12 Claims. (Cl. 251—184)

ABSTRACT OF THE DISCLOSURE

A plug valve having a well with a conical bore intermediate an inlet and outlet port receiving a rotatable plug having a transverse passage alignable with said ports and being resiliently urged into said well. Floatingly carried on the exterior of said plug are a pair of displaced elastomerically coated closure plates which, when the plug is rotated to the closed position of the valve, are supported in closing relation to the inlet and outlet ports of the valve body.

---

The present invention relates to plug valves and is concerned primarily with such a valve which includes sealing elements that are carried by the plug in floating relationship thereto.

A plug valve consists essentially of a body or casing formed with a pair of aligned ports between which there is a conical well which receives a complemental conically shaped plug. This plug is formed with an opening or passage which when the valve is in the open position aligns with the ports aforesaid. When the valve is in the closed position the passageway is transverse to the ports.

An important object of the invention is to provide, in a plug valve of the type aforesaid, a plug having an outer surface which carries, in driving relation, a pair of sealing elements which are in floating relation to the plug and each of which comprises a curved closure plate and a sealing material.

Another important object of the present invention is to provide a plug valve of the type noted which includes a plug having a pair of diametrically opposed recesses formed in its outer surfaces with each receiving, in floating relation, a sealing element in the form of a curved closure plate that is somewhat flexible and which has peripheral dimensions at least equal to the ports in the valve body. Mounted on each closure plate is an appropriate elastomeric sealing material which when the valve is in the closed position engages the edges of one of the ports to establish the sealing relation. The floating relationship between the sealing elements and the plug is importat since it permits the sealing element, through the combined flexibilities of the closure plate and elastomeric material, to independently align itself in highly efficient sealing relationship with the body without reference to the conformity of the conical surfaces of the plug with the surface of the body well. In this invention, highly efficient closure of the valve is established by sealing relationship between the convex surface of the sealing elements and the conical wall of the body. Therefore, the plug is a carrier and positioner of the sealing elements and the sealing elements are in floating relationship to the plug but are not necessarily in sealing engagement with the plug.

For proper functioning of the valve, it is important that each sealing element remain in driving and spaced relationship with the plug. Therefore, another object of the invention is to provide, in a plug valve of the character aforesaid, a pair of curved flexible closure plates as above noted, each of which has a thickness greater than the clearance between the plug and body. This thickness insures that each sealing element will remain in the proper position in the recess provided therefor. With the means just described for assurance that each sealing element will remain in its proper position and since the sealing elements are in floating relationship with the plug, this arrangement provides for easy substitution or replacement of the sealing elements for any purpose such as when a particular elastomer is required for a specific line content being controlled by the valve.

Another object of the invention is to produce a plug valve of the type indicated in which sealing surfaces of the sealing elements are in all positions coincident with the conical wall and the sealing material which is mounted on the closure plate functions as a bearing for the rotative motion of the sealing elements and plug assembly. Under these conditions, the axis of rotation of the sealing elements fall on the longitudinal axis of the conical wall and is independent of the conical surfaces of the plug. To accommodate the self-alignment of the sealing element with the conical wall and for the sealing material to function as a bearing, without interference from the conical surface of the plug, a clearance between the plug and conical wall in the body is essential.

A plug valve of the type noted above presents the advantage of eliminating the necessity for machining the plug and for any additional manufacturing processing to bring the conical surface of the plug and body wall into coincidence. This is true for recesses in the plug, outer surfaces which receive the sealing element as well as the outer conical contour. Any irregularities created by the basic process used in manufacturing the plug are accommodated by the flexible nature of the closure plate and the elastomeric sealing material that is bonded thereto. Thus, another objective for a more economical valve structure is realized.

Another objective of the invention is to provide an effective closure of the valve in the event the elastomeric material is removed from the closure plate such as might be caused by excessive heat. For this purpose, the depth of the recess in the outer surface of the plug must be less than the thickness of the closure plate. Thus, metal to metal contact is assured between the closure plate and the conical surface of the body well.

Yet another object of the invention is to provide a plug valve of the character aforesaid in which the conical plug is urged into the conical well by an external yielding force such as a spring. This arrangement provides for the mechanical advantage of a wedge in utilizing the force of the spring to urge the sealing elements into engagement with the edges of the port. This arrangement has the additional advantage of automatic compensation for any change in the thickness of the sealing material such as might be due to wear or compression set. Also, should the elastomer be completely removed from the sealing elements, the closure plate will be urged into contact with the conical body well providing a closure over the outlet fluid passageway in the body. Still another advantage of this arrangement is that the sealing elements, in being placed by the spring in compressive relationship with the conical well in the body provide a highly efficient seal even at a very low line fluid pressure.

Another important object of the invention is to provide a plug valve of the type noted including floating sealing elements in which the line content under pressure enters behind the sealing elements in particularly that at the outlet port to achieve highly efficient sealing effects. When a plug valve is included in a line containing fluid under pressures, there is always an inlet port and an outlet port in the valve body. Pressures of the fluid at the inlet side causes the flexible sealing elements at that side to give slightly and also to compress the elastomeric material at the edges so that the fluid enters the valve and ultimately gets behind the sealing element on the outlet side. Thus, the line pressure is utilized to force the sealing elements into engagement with the edges of the outlet port. Eventually, the pressure within the valve is equalized and the sealing element on the outlet side is forced against the edges of the outlet port with the combined forces of the fluid pressure and the spring. The sealing element on the inlet side is pressed against the conical well of the body by the spring force only and the plug is pressure balanced.

Another highly important object is to provide a plug valve which for all practical purposes is essentially tamper-proof with ordinary tools. An assembly comprising the plug, the spring, and a spring backing member is retained in the body by a retaining ring which engages an external shoulder on the spring backing member and is received in a groove in the valve body. Spaced inwardly sufficiently to clear the internal diameter of the retaining ring, is an external wall on the spring backing member whose height is approximately equal to the height of the retaining ring. Thus, the assembly can be removed only by forcing the spring backing member inwardly until the wall clears the retaining ring. This is difficult if not impossible with the pressure from the line content opposing this motion and would require special tools.

Still another object of the invention is to produce a plug valve of the character indicated in which the sealing material that is mounted on the closure plate has good abrasive resistance to reduce if not eliminate scarifying action as it passes the edges of the ports, high tensile and tear strength and a low co-efficient of friction with respect to the valve body to incorporate good bearing qualities thereinto.

For a full and more complete understanding of the invention reference may be had to the following description and accompanying drawings, wherein:

FIGURE 5 is a top view partially in section and partially in elevation being taken about on the plane represented by the lines 5—5 of FIGURE 3.

FIGURE 6 is a view similar to FIGURE 5 being taken about on the plane represented by the lines 6—6 of FIGURE 3.

FIGURE 7 is a view in elevation illustrating the plug and a sealing element in exploded relation.

FIGURE 8 is a detailed section through a sealing element being taken about on the plane represented by the line 8—8 of FIGURE 7 and, FIGURE 9 is a detailed section through a sealing element being taken about on the plane represented by the line 9—9 of FIGURE 7.

Figure 1:
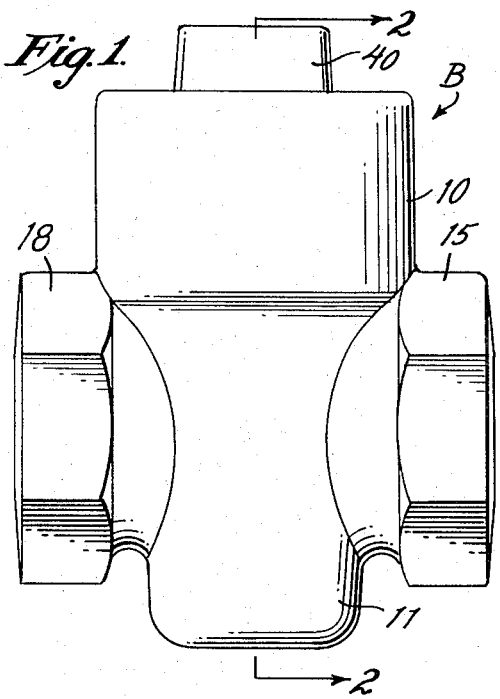
FIGURE 1 is a view in side elevation of the plug valve of this invention.
Figure 2:
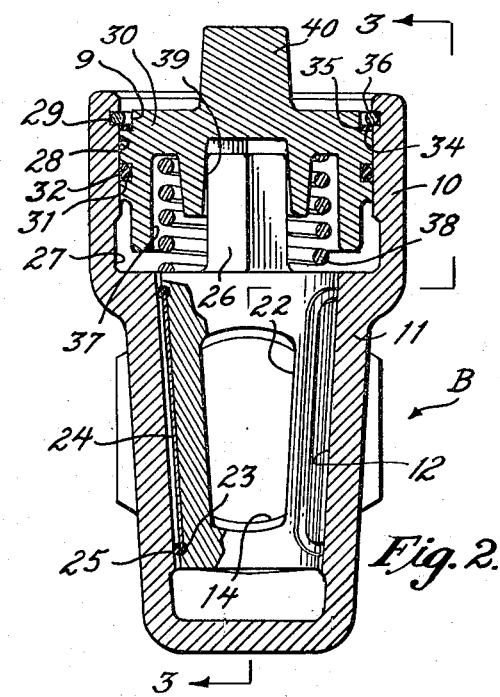
FIGURE 2 is a section through the plug valve of FIGURE 1 being taken about on the plane represented by the line 2—2 of FIGURE 1.
Figure 3:
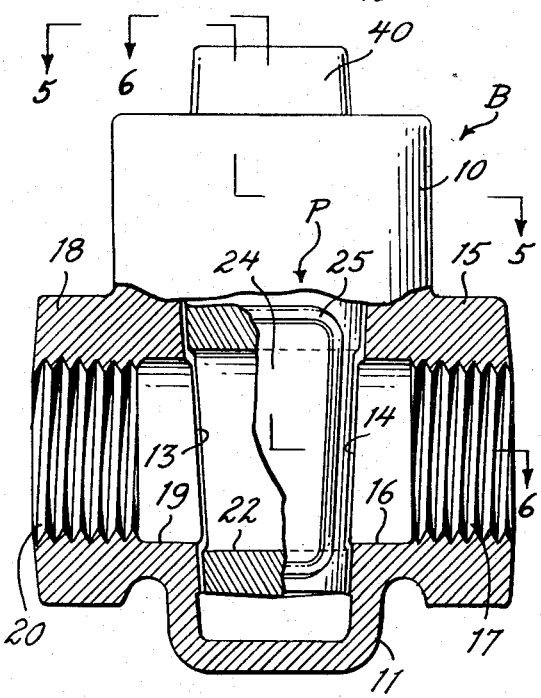
FIGURE 3 is a view taken normal to the showing of FIGURE 2 with parts being shown in elevation and parts in section and with the valve in open position.
Figure 4:
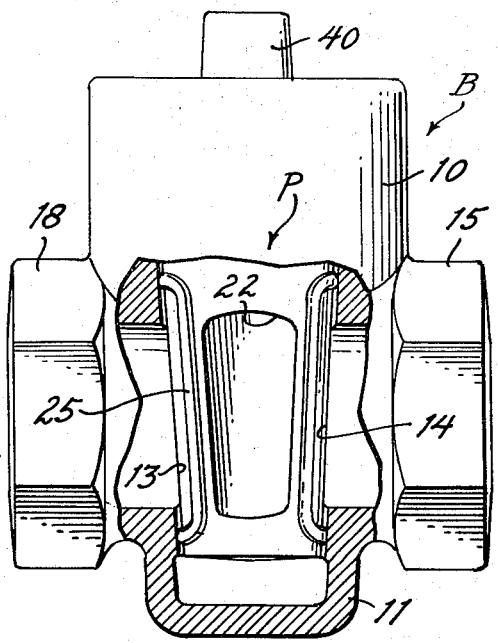
FIGURE 4 is a view similar to FIGURE 3 with the valve in closed position.

Referring now to the drawings and first more particularly to FIGURES 1–4 inclusive, a valve body or casing is therein illustrated and referred to in its entirety by the reference character B. The body B comprises an upper cylindrical part 10 to which is integrally joined a conical well 11 presenting a tapered bore 12. Opening into the bore 12 of the well 11 from opposite sides are a pair of ports 13 and 14. One of these is the inlet port and the other an outlet port depending on the direction of flow of fluid through the valve.

Extending laterally outwardly from the port 14 is a boss 15 having a bore 16 which terminates in the port 14 and the outer portion of which is internally threaded as shown at 17 to provide for a connection of a fluid line thereto. The boss 15 will ordinarily be of hexagonal shape for wrench engaging purposes. There is also a boss 18 which extends laterally outwardly from the port 13 and which has a bore 19 terminating in the port 13 and the outer internally threaded portion 20.

A plug is referred to in its entirety by the reference character P (see FIGURE 7). The plug P has a main body portion 31 of a conical contour complemental to the tapered bore 12 of the well 11 in which it is received. The plug 21 is formed with a transverse passage 22 of substantially the same size and shape as the ports 13 and 14 with which it aligns when the valve is in open position.

Spaced substantially 90° from the ends of the passage 22 and disposed therebetween are a pair of shallow recesses 23 formed in the plug P. Received in each recess 23 and in floating relation with respect to the plug P is a sealing element referred to in its entirety by the reference character S (see FIGURES 7, 8, and 9). Each sealing element S comprises a thin flexible material 24 such as steel and bonded thereto is a sealing material 25. The sealing material 25 may vary with any particular fluid, the flow of which is controlled by the valve. However, it must have the properties of high abrasive resistance and a low co-efficient of friction because it is this sealing material which provides the bearing for rotation of the plug. Moreover, if the plug rotates, the sealing material must pass over the sharp edges defining the ports 13 and 14 and must be resistant to the scarifying effect of such action. One example of such a sealing material is a compound of polyurethane and molybdenum disulfide such as disclosed in the co-pending application of William L. Hulslander and Russel M. Houghton, Ser. No. 407,242, filed Oct. 28, 1964, and entitled, "Polyurethane Compound."

It is important to note that the plate 24 has a thickness somewhat in excess of the clearance between the plug P and bore 12 of the well 11. This provides assurance that each sealing element S will remain in position in a recess 23.

Integrally formed with a conical body 21 and extending upwardly therefrom is a shank 26 of non-circular formation such as the square-cross section illustrated. This shank 26 extends up into the cup-shaped recess 27 (see FIGURE 2) provided by the cylindrical portion 10 of the valve body.

The cylindrical part 10 has a bore at 28 which terminates at the top in an inwardly opening annular groove 29.

A spring backing and operating member 30 of cylindrical shape is received in the recess 27 which includes the bore 28. The outer cylindrical wall of the member 30 is formed with an annular groove 31 which receives an O-ring packing 32. At the top, this spring backing member 30 is formed with an annular recess providing a shoulder at 34 and a cylindrical wall 9 upstanding therefrom. Received in this shoulder 34 is a plastic bearing ring 35, such as Teflon, and a retaining ring 36 is received in the groove 29 and engages the upper face of the bearing ring 35.

The member 30 is formed with a downwardly opening annular recess 37 which receives an expansion coiled spring 38. The upper end of the spring 38 bears against the upper end wall of the recess 37 and the lower end against the upper face of the plug body 21 with the shank 26 passing up through the spring.

The member 30 is formed also with a central socket 39 of a non-circular shape corresponding to the shank 26 which is received therein, and at the top is provided with a wrench engaging member 40.

It is evident that a wrench may be applied to the member 40 to rotate the member 30 and through the socket 39 and shank 26, the plug P. Thus, the plug P may be moved into open or closed position.

During such movement, the sealing material 25 of the sealing elements S passes over the edges of the ports 13 and 14. Moreover, this sealing material provides the bearing for the rotative movement. In closed position one of the sealing elements S will be opposite to one of the ports 13 and 14 and the other sealing element opposite to the other port. Depending on the direction of the flow, one of these ports will be the inlet port and the other the outlet port. Pressure from the fluid at the inlet side will compress the sealing material 25 in its recess 23 and fluid will pass around the sealing material into the interior of the well. Thus, it will enter in back of the sealing elements S at the outlet side. Thus, the pressure of this fluid will force the sealing element at the outlet side against the edges of the outlet port. After a period, the pressure within the valve is equalized at the outlet body port while the inlet sealing element is approximately in balance with the fluid content under pressure.

It is evident that the spring 38 consistantly urges the conical plug P down into the well 11; thus, the force of this ring also urges the sealing elements against the ports.

While preferred specific embodiments of the invention are hereinbefore set forth, it is to be clearly understood that the invention is not to be limited to the exact constructions, mechanisms, and materials described because various modifications of these details may be provided in putting the invention into practice within the purview of the appended claims.

What is claimed is:

1. In a plug valve, a valve body having a well with a conical bore and a pair of spaced ports, a conical plug having a transverse passageway rotatably received in said bore, a pair of bore conforming floating sealing elements movably carried with the plug and rotatably supporting the plug assembly, each sealing element comprising a closure plate of an extent at least equal to one of said ports and a sealing material mounted on said plate, means for urging said plug into said well, and means for rotating said plug to bring said sealing elements opposite to said spaced ports to close the same.

2. The plug valve of claim 1 in which the closure plate of each sealing element is somewhat flexible.

3. The plug valve of claim 1 in which the closure plate of each sealing element has a curvature substantially corresponding to the curvature of the conical body well.

4. The plug valve of claim 1 in which there is a clearance between the plug and well bore and each closure plate has a thickness greater than said clearance.

5. In a plug valve, a valve body having a well with a conical bore and a pair of spaced ports, a conical plug rotatably received in said bore having a transverse passage and a pair of recesses formed in its outer surface and spaced apart corresponding to the spacing of said ports, a floating sealing element in each of said recesses and in bearing engagement with the valve body, each of said sealing elements comprising a closure plate of an extent at least equal to one of said ports and a sealing material mounted on said plate, a spring normally urging said plug into said well, and means for rotating said plug to bring said sealing elements opposite to said spaced ports to close the same.

6. The plug valve of claim 5 in which each of the recesses has a depth less than that of a closure plate.

7. In a plug valve, a valve body having a well with a conical bore and a pair of diametrically opposed ports, a conical plug rotatably received in said bore having a transverse passage aligning with said ports when the valve is in open position and a pair of diametrically opposed recesses formed in its outer contour between the ends of said passage, said plug being supported to define a clearance between the outer contour of said plug and said tapered bore, a floating sealing element in each of said recesses, each of said sealing elements comprising a thin flexible curved plate thicker than said clearance, of an extent greater than one of said ports, a spring normally urging said plug into said well, and means for rotating said plug to bring said sealing elements into position closing said ports.

8. In a plug valve, a valve body having a conical well with a bottom closure, an upper boss with a bore communicating with said well and a pair of spaced ports opening into said well, a conical plug rotatably received in said bore and having a transversal passage, a pair of floating sealing elements comprising a closure plate of an extent at least equal to one of said ports and a sealing material secured thereto rotatably carried by said plug and spaced apart corresponding to the spacing of said ports, a spring backing member rotatably in the bore of said boss, an expansion spring between said plug and backing member, means establishing a driving connection between said plug and backing member, and means for maintaining said backing member in sealing and assembled relation in said boss.

9. The plug valve of claim 8 in which the backing member is retained in said boss by a removable retaining ring that is seated in an internally opening groove in said boss and engages a shoulder on said backing member.

10. The plug valve of claim 8 in which the backing member is retained in said boss by a removable retaining ring that is seated in an internally opening groove in said boss and engages a shoulder on said backing member with the latter having a cylindrical well upstanding from the shoulder a height at least equal to the diameter of the retaining ring.

11. In a plug valve, the combination comprising a valve body having a valve with a conical bore intermediate a pair of spaced ports defining an inlet and an outlet, a conical plug rotatably received in said bore and having a transverse passageway alignable with said ports, at least one floating sealing element movably carried by said plug displaced from the passageway therein and comprising a closure plate of an extent at least equal to the outlet of said ports and a sealing material secured thereto, means for urging said plug into said well, and means operable to effect rotational displacement of said plug to a position wherein a sealing element is supported opposite the outlet of said ports for effecting closure thereof.

12. In a plug valve according to claim 11 in which the inlet and outlet of said valve body are optionally interchangeable and said at least one sealing element is effective to close either of said ports selected as the outlet when positioned opposite thereat.

References Cited

UNITED STATES PATENTS

| | | | |
|---|---|---|---|
| 1,624,512 | 4/1927 | Shipley | 251—184 |
| 1,872,417 | 8/1932 | Dalldorf | 251—175 |
| 2,845,248 | 7/1958 | Fuglie | 251—175 |
| 3,035,811 | 5/1962 | Hamer | 251—317 |
| 3,069,129 | 12/1962 | Grove | 251—175 |
| 3,103,948 | 9/1963 | Salmen | 251—175 X |
| 3,154,097 | 10/1964 | Wolff | 251—192 X |
| 3,254,872 | 6/1966 | Roos | 251—192 X |

FOREIGN PATENTS

| | | |
|---|---|---|
| 119,530 | 9/1947 | Sweden. |
| 159,666 | 3/1921 | Great Britain. |

CLARENCE R. GORDON, *Primary Examiner.*